Figure 1:
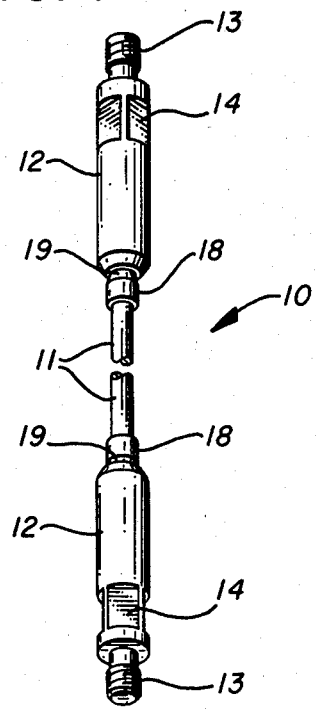

United States Patent [19]

McKay

[11] 4,401,396
[45] Aug. 30, 1983

[54] FIBERGLASS OIL WELL SUCKER ROD

[76] Inventor: Angus T. McKay, 1105 D'Amico Dr., Chicago Heights, Ill. 60411

[21] Appl. No.: 236,664

[22] Filed: Feb. 23, 1981

[51] Int. Cl.³ ............................................. F16B 11/00
[52] U.S. Cl. ..................................... 403/13; 403/268
[58] Field of Search ............... 403/268, 267, 266, 265, 403/368, 13

[56]         References Cited
        U.S. PATENT DOCUMENTS

| 2,212,153 | 8/1940 | Eaton et al. | 403/227 |
| 2,322,587 | 6/1943 | Payne | 285/DIG. 16 |
| 3,018,140 | 1/1962 | Portz et al. | 403/268 X |
| 4,190,479 | 2/1980 | Smith | 156/294 |
| 4,315,699 | 2/1982 | Lusk | 403/361 |

FOREIGN PATENT DOCUMENTS

| 681550 | 10/1952 | United Kingdom | 403/267 |
| 289249 | 12/1970 | U.S.S.R. | 285/DIG. 16 |

*Primary Examiner*—Andrew V. Kundrat
*Attorney, Agent, or Firm*—Warren H. Kintzinger

[57] ABSTRACT

A fiberglass oil well sucker rod with a male threaded fitting bonded to each end of a fiberglass rod so that the fiberglass sucker rod may be threadedly connected through interconnecting female threaded couplings in a well string to other like rods of the same or different lengths and/or to a down-the-well pump and to well string drive and pump drive equipment at the top of the well. Fittings on ends of a fiberglass rod include an annular shoulder that holds a centering ring for the rod, four tapered pocket steps, and finally, a centering pocket beyond the innermost step. The taper of tapered pocket closest to the fitting opening is more shallow than the taper of the following tapered pockets with the minor diameter of each taper having a radiused entrance tangential to the angle of the taper of the pocket to relieve stress on the epoxy used bonded to the rod and filling space between the rod and the fitting. Rather than the assembly being completely bonded together a mold release agent is coated on the interior of each fitting and the epoxy bonded to the rod with the wedges formed thereof holding the rod ends within the opposite end fittings.

4 Claims, 3 Drawing Figures

FIBERGLASS OIL WELL SUCKER ROD

This invention relates in general to fiberglass sucker rods for well strings in oil wells and, more particularly, to effective, improved fiberglass rod to metal fitting end interconnect with epoxy (bonding material) used bonded to the rod and filling space between the rod and the fitting.

Fiberglass sucker rods properly designed, installed and used significantly increase oil production, reduce lifting costs and reduce capital expenditures for beam type pumping systems. Fiberglass rods, made with fiberglass in a polyester resin base, feature lightweight and high strength and offer many advantages over conventional steel sucker rods including increased oil production. Fiberglass sucker rods can be pumped at speeds that would overstress heavy steel rod strings with lightweight fiberglass rods reducing loads on the drive gear box, structure and prime mover such as to permit faster operation. Reduced pumping unit loading through use of fiberglass strings permits use of the maximum stroke length setting and also pumping at greater depths where steel string stress level and/or pumping unit loading is a restriction. It is also of interest that the increased elasticity of a fiberglass sucker rod string over a steel sucker rod string yields a longer, more effective pump stroke, particularly if the sucker rod string is "tuned" to the specific well installation. Initial lifting equipment and field maintenance costs are reduced in that string body partings due to corrosion is eliminated since fiberglass rod bodies do not corrode in an oil well environment, and partings due to stress and stress corrosion are minimized with relative light weight of fiberglass rod strings reducing the rod string stress levels. The weight reduction in sucker rod strings saves on electrical energy consumption per barrel of oil lifted, and capital equipment costs can be reduced in that beam pumping systems can be designed around smaller pumping units and less powerful prime movers.

Fiberglass sucker rods yielding all of these advantages must be designed to be compatible with standard tools used in the oil production industry with a requirement for end fittings on the ends of the fiberglass sucker rods compatible with standard elevators, rod wrenches and power tongs. While the many advantages presented may be attained through the use of fiberglass sucker rods, a major problem in the past has been to provide a safe, secure interconnection between the fittings and the ends of the individual rods. Fiberglass is just difficult to grab a hold of and hold securely and it is very important that the structure have such integrity as to substantially eliminate fiberglass rod-to-end fitting parting in fiberglass sucker rods used in a well string when used within predetermined design capacities. Damaging stress concentrations in the area of rod entry into a fitting and within the rod end fittings must be minimized, as well as tool impact damage to a rod adjacent entry into a fitting.

It is, therefore, a principal object of this invention to provide a fiberglass sucker rod with metal fittings on opposite ends that can be readily installed in an oil well string and used within design limits without end fitting to fiberglass rod parting.

Another object is to provide such fiberglass sucker rods having excellent non-corrosive and long service life characteristics.

A further object is to provide an oil well sucker rod more resilient and adequately strong yet lighter than pre-existing steel sucker rods.

Another object is to increase oil pumping production from wells at a savings in equipment costs and with significant power savings.

Features of the invention useful in accomplishing the above objects include, in a fiberglass oil well sucker rod, a fiberglass rod having metal fittings at each end that may be threadedly connected through interconnecting threaded couplings to other like sucker rods of the same or different lengths and/or to a down-the-well pump and to well string drive and pump drive equipment at the top of the well. The fittings on ends of a fiberglass sucker rod include an annular shouldered pocket holding a centering ring for the rod that also projects for a protective distance from the rod end of the fitting, four tapered pocket steps with at least the closest tapered pocket to the rod entrance end having a more shallow taper than the next tapered pocket, and finally, a centering pocket beyond the innermost step. The minor diameter of each tapered pocket has a radiused entrance tangential to the angle of the taper of the respective pockets to relieve stress on the epoxy (or its equivalent) used bonded to the rod and filling space between the rod and each fitting. Rather than the assembly being completely bonded together a mold release agent is coated on the interior of each fitting and the epoxy bonded to the rod with the wedges formed thereof holding the rod end within the opposite end fittings.

A specific embodiment representing what is presently regarded as the best mode of carrying out the invention is illustrated in the accompanying drawing.

Figure 3:
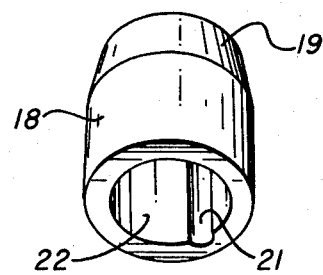
Figure 2:
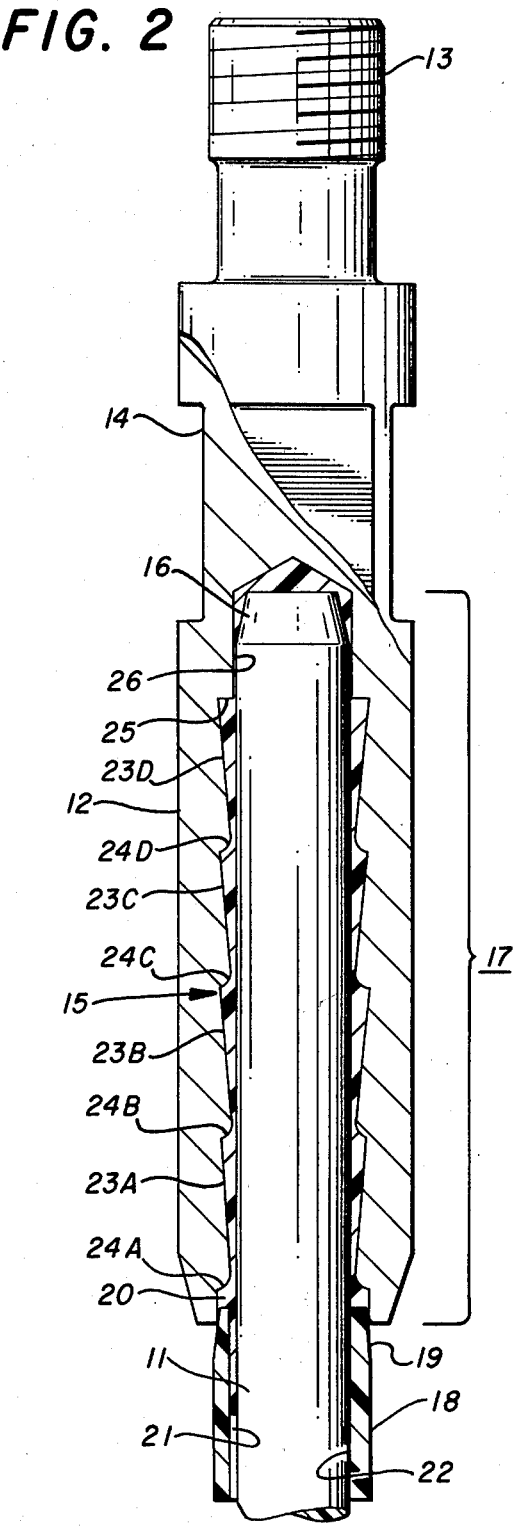

In the drawing:

FIG. 1 represents a perspective view of an oil well sucker rod equipped with duplicate male fittings on the opposite ends;

FIG. 2, a partially cut away and sectioned view of the sucker rod of FIG. 1 showing additional detail of the rod end fitting and rod end to fitting interconnection detail; and FIG. 3, a perspective view of the centering ring used for centering of the rod relative to the interior of a fitting and to shield the rod from tool impact damage for a distance from the open end of the fittings.

REFERRING TO THE DRAWING:

An oil well sucker rod 10, as shown in FIGS. 1 and 2, is a fiberglass rod 11 with metal male fittings 12 having a threaded extension 13 and a tool engaging section with flats 14 mounted on each end. Each metal male fitting 12 has an opening 15 into which a fiberglass rod 11 is inserted with rod tapered end 16 inserted through length 17 of the fitting opening 15. A centering ring 18 (a nylon ring with an I.D. approximately 0.002 inches smaller than the O.D. of the fiberglass rod 11 inserted therethrough) has a tapered shoulder 19 centering the ring 18 in its holding pocket 20 in the fitting opening 15. Centering ring 18 is provided with an epoxy flow relief passage 21 and has an inner wall 22 I.D. approximately 0.002 inches less than the O.D. of rod 11.

There are four successive tapered pockets 23A, 23B, 23C and 23D within opening 15 and the minor diameter of each tapered pocket has a radiused entrance 24A, 24B, 24C and 24D, respectively, tangential to the angle of the taper of the respective pockets to relieve stress on the epoxy (or its equivalent) used bonded to the rod and filling space between the rod 11 and each fitting 12. The four steps or tapers in the fitting opening 15 consist of at least two different angles with the pocket 23A closest to the rod entrance end of opening 15 being the shallowest taper at approximately a 2.5° taper and the following pockets 23B, 23C and 23D having approximately a 5.5° taper in the embodiment shown. In another embodiment, not shown, the four tapered pocket steps have successively steeper tapers from pocket 23A, being the shallowest at approximately a 2.5° taper, and the following pockets 23 being successively approximately 3.5°, 4.5° and 5.5° tapers, respectively. The last tapered pocket 23D ends with shoulder 25 and centering pocket 26 is extended therebeyond.

The rod tapered end 16 is a ⅜-inch long 5° taper ground on each end of each fiberglass rod 11 to readily facilitate insertion of the rod 11 into nylon centering ring 18. Approximately 4⅜ inch of each end of fiberglass rod 11 is sandblasted using a ¼-inch sandblasting nozzle and 50 grit sand to optimize bonding of epoxy and the epoxy wedges filling tapered pockets 23A, 23B, 23C and 23D to the respective end of rod 11. Before each fitting 12 receives epoxy in opening 15 the opening internal surfaces are coated with a mold release agent particularly through the range of tapered pockets 23A-23D to allow epoxy wedges cured in tapered pockets 23A-23D to move forward ever so slightly against the tapered shoulders of the pockets 23A-23D. When a rod 11 is prepared for insertion into a fitting 12 and the fitting is prepared to receive a rod end, a predetermined quantity of epoxy in fluid form is placed in opening 15, and with centering ring 18 inserted with tapered shoulder 19 in holding pocket 20, the rod end is inserted through the centering ring 18 and fully into the opening 15 and centering pocket 26. The centering ring 18 and centering pocket 26 center the fiberglass rod 11 in fitting 12 almost perfectly to in effect optimally minimize, if not eliminate, any likelihood of stress risers occurring because of uneven loading from rods 11 not being parallel to the center line of a fitting 12 connected thereto. As an end of a rod 11 is fully inserted into opening 15 of a fitting 12 the epoxy in fluid form placed therein flows to fill the spaces between the rod end and fitting 12 with any excess to the proper amount of epoxy flowing into epoxy flow relief passage 21. The rod 11 with its end fittings 12 is then placed in an oven for epoxy curing, baked at 300° for 2½ hours, allowed to cool to room temperature and then placed in a machine for tensile loading (running to approximately 22,000 pounds tensile loading). With mold release having been used on the inner surface of fitting opening 15 allows the epoxy wedges to move forward minutely, if they move forward at all, completing the joint. In addition to the rod 11 centering function provided by centering ring 18 in extending approximately one inch out of opening 15 it provides a shield for the rod 11 from tool impact damage for a distance from the open end of each fitting 12. Centering rings 18 made from nylon are excellent in providing such useful functional advantages.

The fiberglass rod 11 to fitting 12 interconnection is excellent, particularly with four tapered wedge pockets, with the first being less tapered than the following. Each wedge minimum diameter being properly radiused along with uniform annular thickness through cured epoxy with properly centered relation between rod end and fitting minimizes stress concentration problems, particularly with properly centered alignment through rod to fitting interconnect reducing the possibility of uneven loading. This rod has a higher inplane shear value and may as a result be of smaller diameter to in turn reduce loading in a well string still further.

Whereas, this invention is herein illustrated and described with respect to a plurality of embodiments thereof, it should be realized that various changes may be made without departing from the essential contributions to the art made by the teachings hereof.

I claim:

1. A fiberglass sucker rod for well strings in a well such as an oil well including: a fiberglass rod cut to length; fittings each with a rod end receiving opening mounted on opposite ends of said fiberglass rod; said rod end receiving openings in said fittings having a successive positioned plurality of tapered annular pockets; space between a rod end and the walls of said rod end receiving opening being filled by a hardened bonding matter, formerly in fluid form at time of rod end to fitting assembly; and said hardened bonding matter forming tapered annular wedges each bonded to said rod and generally in the shape of the respective tapered pockets forming molds for the bonding matter contained therein as it hardens to the solid state; and with the tapered annular pocket and the tapered annular wedge contained therein closest to the rod entrance end of said fitting opening having a more shallow taper than the taper of following tapered pockets and the tapered annular wedges contained therein; wherein the outer diameter of the fiberglass rod throughout the distance of said successively positioned plurality of tapered annular pockets is of less diameter than the minor diameter of each of said successively positioned plurality of tapered annular pockets; and with said annular tapered wedges interconnected by hardened bonding matter; each of said successively positioned plurality of tapered annular pockets at the minor diameter thereof has an annular radiused entrance tangential to the angle of the taper of the pocket to relieve stress in hardened bonding matter shaped thereby; centering means contributes to properly centered alignment between the rod and fitting through each rod to fitting interconnect; said centering means includes a centering ring seated in an annular shoulder at the rod entrance of said fitting opening; said centering ring projects for a protective distance from the rod end of the fitting to protect from tool impact damage; and, wherein said centering ring is provided with a bonding agent relief passage to receive excess flow of bonding agent in the fluid form as a rod end and fitting are assembled together.

2. The sucker rod of claim 1, wherein said centering means also includes a centering pocket beyond the innermost step remote from the rod entrance end of said fitting opening.

3. The sucker rod of claim 1, wherein the wall surfaces of said tapered annular pockets in the rod end receiving openings in said fittings are coated with a mold release material prior to bonding matter in fluid form being placed in said rod end receiving openings; and with said tapered annular wedges while bonded to rod ends of said fiberglass rod being free of bonded attachment to the wall surfaces of said tapered annular pockets.

4. The sucker rod of claim 3, wherein said tapered annular wedges are tapered larger diameter to smaller diameter toward the rod entrance end of said fitting opening.

* * * * *